(12) United States Patent
Francis et al.

(10) Patent No.: US 10,592,512 B2
(45) Date of Patent: Mar. 17, 2020

(54) CUSTOMIZING REQUESTED ELECTRONIC CONTENT BASED ON REQUESTING ENTITY INFORMATION AND CONTEXTUAL INFORMATION

(71) Applicant: Microsoft Technology Licensing, LLC, Redmond, WA (US)

(72) Inventors: Daniel Francis, Belmont, CA (US); Jeremy Lwanga, San Francisco, CA (US); Chenhui Zhai, Sunnyvale, CA (US); Jeffrey Wong, Sunnyvale, CA (US); Xuan Lu, Santa Clara, CA (US); Wenjun Wu, San Jose, CA (US); Bijal Parikh, Sunnyvale, CA (US); Sarah Yu, Sunnyvale, CA (US); John Wu, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 15/721,810

(22) Filed: Sep. 30, 2017

(65) Prior Publication Data
US 2019/0102439 A1 Apr. 4, 2019

(51) Int. Cl.
| | | |
|---|---|---|
| G06F 16/00 | (2019.01) | |
| G06F 16/2457 | (2019.01) | |
| H04L 29/08 | (2006.01) | |
| G06F 16/28 | (2019.01) | |
| G06F 16/242 | (2019.01) | |
| G06F 16/2455 | (2019.01) | |

(52) U.S. Cl.
CPC .... *G06F 16/24575* (2019.01); *G06F 16/2445* (2019.01); *G06F 16/2456* (2019.01); *G06F 16/288* (2019.01); *H04L 67/1091* (2013.01); *H04L 67/26* (2013.01)

(58) Field of Classification Search
CPC .................................................. G06F 16/24575
USPC .................................................. 707/781, 723
See application file for complete search history.

(56) References Cited

U.S. PATENT DOCUMENTS

| | | | | |
|---|---|---|---|---|
| 2010/0017287 | A1* | 1/2010 | Caldwell ................ | G06Q 30/02 705/14.43 |
| 2013/0268373 | A1* | 10/2013 | Grishaver .............. | G06Q 30/02 705/14.67 |
| 2014/0114965 | A1* | 4/2014 | Balduzzi ................ | G06Q 50/10 707/723 |

(Continued)

*Primary Examiner* — Chelcie L Daye
(74) *Attorney, Agent, or Firm* — Hickman Palermo Becker Bingham LLP; Daniel D. Ledesma

(57) ABSTRACT

Techniques are provided for dynamically generating content. A request for content about a first entity is received from a client device. In response to receiving the request, an identity of a second entity of the client device is determined. Based on the identity, attributes of the second entity are identified. It is determined whether the attributes satisfy targeting criteria of a campaign that was initiated by the first entity. In response to determining that the attributes satisfy the targeting criteria, a first number of entities that (i) share one or more attributes in common with the second entity and (ii) satisfy the targeting criteria is determined. Also, a second number of entities that share the one or more attributes in common with the second entity is determined. A ratio is calculated based on the two numbers. First content that specifies the ratio is sent to the client device for display.

20 Claims, 7 Drawing Sheets

(56) References Cited

U.S. PATENT DOCUMENTS

2016/0267544 A1* 9/2016 Flood ................ G06F 16/9535

* cited by examiner

CUSTOMIZING REQUESTED ELECTRONIC CONTENT BASED ON REQUESTING ENTITY INFORMATION AND CONTEXTUAL INFORMATION

TECHNICAL FIELD

The present disclosure relates to dynamic generation of electronic content and, more particularly to, customizing requested electronic content based on information of a requesting entity and a contextual entity. SUGGESTED CLASSIFICATION: 715/744; SUGGESTED ART UNIT: 2143.

BACKGROUND

The Internet allows end-users operating computing devices to request content from many different publishers. Some publishers desire to send additional content items to users who visit their respective websites or who otherwise interact with the publishers. To do so, publishers may rely on a content delivery service that delivers the additional content items over one or more computer networks to computing devices of such users. Some content delivery services have a large database of content items from which to select. Different content items may originate from different content providers.

However, current publishers tend to separate the selection and presentation of additional content items from the content (of the publishers) that is actually being requested by a user. Thus, current approaches for a publisher to generate requested content for a user fail to consider the content providers that may be interested in that user. Accordingly, user engagement with requested content may be much higher if the content providers of the additional content items are taken into account. Improvements in requested electronic content generation are needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system are provided for dynamically generating entity-specific and recruiting-related information based on content that a requesting entity has requested. The requested content is related to a contextual entity, such as an organization or company. The recruiting-related information may be displayed only if certain conditions are satisfied. In one technique, the contextual entity initiates a recruiting campaign that includes targeting criteria. The recruiting campaign may be considered along with other recruiting campaigns initiated by other entities when determining, in response to a content request, which campaigns to select for a particular slot on a dynamically-generated web page. However, when requested content is related to the contextual entity, then only that contextual entity's recruiting campaign is considered. In a related technique, before the recruiting-related information is presented to the requesting entity, a determination is made regarding whether the requesting entity is part of a certain population of entities that satisfy the targeting criteria. If so, then the recruiting-related information is presented to the requesting entity.

Embodiments described herein improve computer-related technology; specifically, intelligent electronic content generation technology. Embodiments may result in goals of contextual entities being reached much faster since a potentially greater population of users may be exposed to their respective recruiting-related content through additional entry points. Additionally, because a contextual entity's goals are reached much more quickly, embodiments may result in more efficient use of a contextual entity's resources.

System Overview

Figure 1:
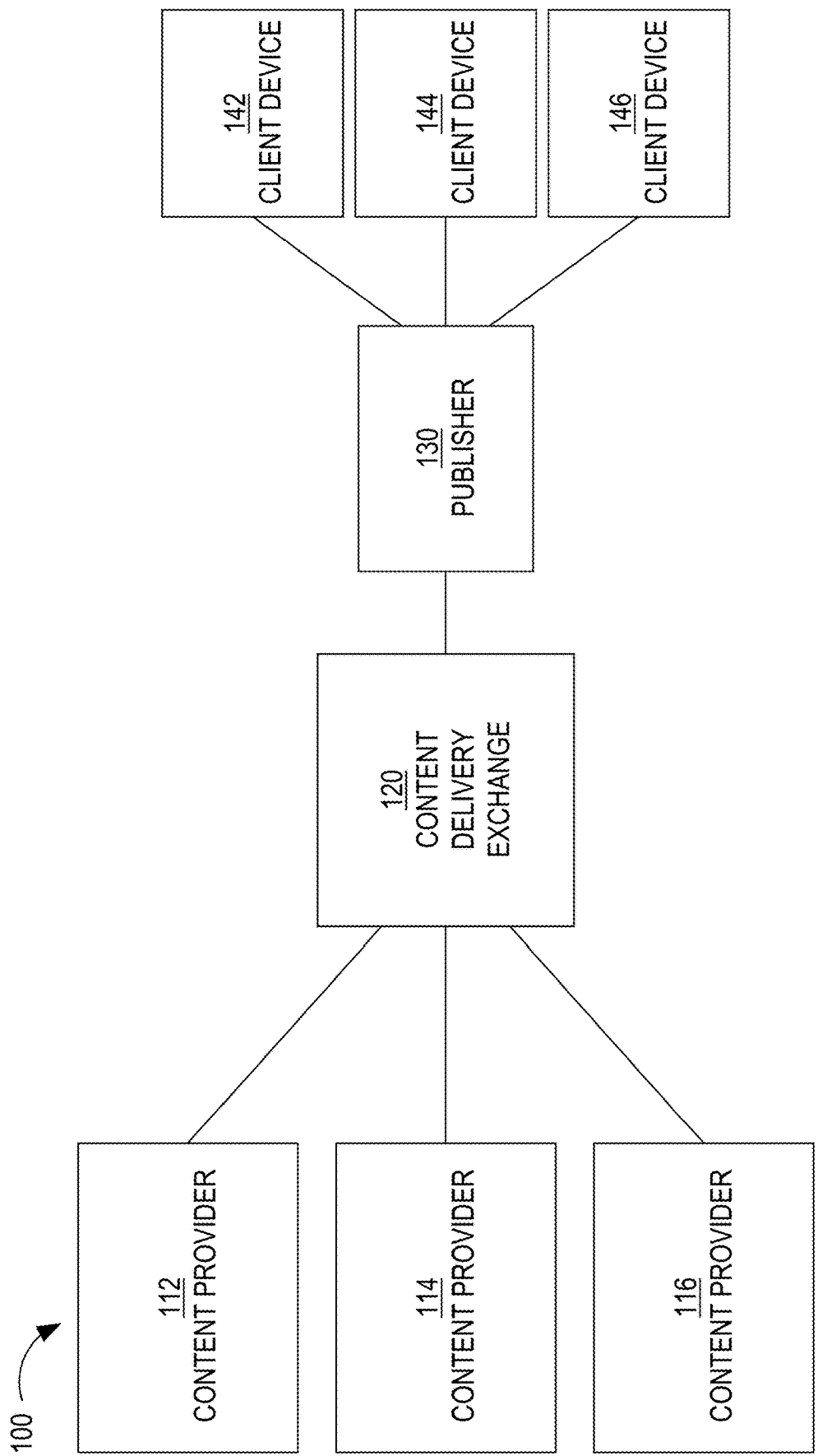
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery exchange 120, a publisher 130, and client devices 142-146. Although three content providers are depicted, system 100 may include more or less content providers. Similarly, system 100 may include more than one publisher and more or less client devices.

Content providers 112-116 interact with content delivery exchange 120 (e.g., over a network, such as a LAN, WAN, or the Internet) to enable content items to be presented, though publisher 130, to end-users operating client devices 142-146. Thus, content providers 112-116 provide content items to content delivery exchange 120, which in turn selects content items to provide to publisher 130 for presentation to users of client devices 142-146. However, at the time that content provider 112 registers with content delivery exchange 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 120.

Although depicted in a single element, content delivery exchange may comprise multiple computing elements and devices, connected in a local network or distributed regionally or globally across many networks, such as the Internet. Thus, content delivery exchange 120 may comprise multiple computing elements, including file servers and database systems.

Publisher 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 130 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 130 provides the requested content (e.g., a web page) to the client device.

Simultaneously or immediately before or after the requested content is sent to a client device, a content request is sent to content delivery exchange 120. That request is sent (over a network, such as a LAN, WAN, or the Internet) by publisher 130 or by the client device that requested the original content from publisher 130. For example, a web page that the client device renders includes one or more calls (or HTTP requests) to content delivery exchange 120 for one or more content items. In response, content delivery exchange 120 provides (over a network, such as a LAN, WAN, or the Internet) one or more particular content items to the client device directly or through publisher 130. In this way, the one or more particular content items may be presented (e.g., displayed) concurrently with the content requested by the client device from publisher 130.

In response to receiving a content request, content delivery exchange 120 initiates a content item selection event that involves selecting one or more content items (from among multiple content items) to present to the client device that initiated the content request. An example of a content item selection event is an auction.

Content delivery exchange 120 and publisher 130 may be owned and operated by the same entity or party. Alternatively, content delivery exchange 120 and publisher 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 120, and that bids for space (on one or more publishers, such as publisher 130) to present content items on behalf of multiple content providers. Thus, a bidder is another source of content items that content delivery exchange 120 may select for presentation through publisher 130. Thus, a bidder acts as a content provider to content delivery exchange 120 or publisher 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery exchange 120. A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view the set of content items, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographic location or area, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 120 receives, from a computing device, a request that does not satisfy the targeting criteria, then content delivery exchange 120 ensures that any content items associated with the particular content delivery campaign are not sent to the computing device.

Thus, content delivery exchange 120 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery campaign 120 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher 130 may not satisfy targeting criteria of one content item of a campaign, the same content request may satisfy targeting criteria of another content item of the campaign.

Different content delivery campaigns that content delivery exchange 120 manages may have different charge models. For example, content delivery exchange 120 may charge a content provider of one content delivery campaign for each presentation of a content item from the content delivery campaign (referred to herein as cost per impression or CPM). Content delivery exchange 120 may charge a content provider of another content delivery campaign for each time a user interacts with a content item from the content delivery campaign, such as selecting or clicking on the content item (referred to herein as cost per click or CPC). Content delivery exchange 120 may charge a content provider of another content delivery campaign for each time a user performs a particular action, such as purchasing a product or service, downloading a software application, or filling out a form (referred to herein as cost per action or CPA). Content delivery exchange 120 may manage only campaigns that are of the same type of charging model or may manage campaigns that are of any combination of the three types of charging models.

A content delivery campaign may be associated with a resource budget that indicates how much the corresponding content provider is willing to be charged by content delivery exchange 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request that originates from the computing device. Thus, each content request that content delivery exchange 120 receives triggers a content item selection event.

For example, in response to receiving a content request, content delivery exchange 120 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 120 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery exchange 120) for having a content item of the campaign presented to (or selected by) an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

In one embodiment, content delivery exchange 120 conducts one or more content item selection events. Thus, content delivery exchange 120 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, and a CPC or CPM of each campaign.

In another embodiment, an exchange that is owned and operated by an entity that is different than the entity that owns and operates content delivery exchange 120 conducts one or more content item selection events. In this latter embodiment, content delivery exchange 120 sends one or more content items to the other exchange, which selects one or more content items from among multiple content items that the other exchange receives from multiple sources. In this embodiment, content delivery exchange 120 does not know (a) which content item was selected if the selected content item was from a different source than content delivery exchange 120 or (b) the bid prices of each content item that was part of the content item selection event. Thus, the other exchange may provide, to content delivery exchange 120 (or to a performance simulator described in more detail herein), information regarding one or more bid prices and, optionally, other information associated with the content item(s) that was/were selected during a content item selection event, information such as the minimum winning bid or the highest bid of the content item that was not selected during the content item selection event.

Tracking User Interactions

Content delivery exchange 120 tracks one or more types of user interactions across client devices 142-146 (and other client devices not depicted). For example, content delivery exchange 120 determines whether a content item that content delivery exchange 120 delivers is presented at (e.g., displayed by or played back at) a client device. Such a "user interaction" is referred to as an "impression." As another example, content delivery exchange 120 determines whether a content item that exchange 120 delivers is selected by a user of a client device. Such a "user interaction" is referred to as a "click." Content delivery exchange 120 stores such data as user interaction data, such as an impression data set and/or a click data set.

For example, content delivery exchange 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a user identifier of a user that operates the particular client device. Thus, if content delivery exchange 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item.

Recruiting Campaign

A recruiting campaign is a type of content delivery campaign and may be a candidate in a set of candidate content delivery campaigns. A purpose of a recruiting campaign may be to persuade users to join a particular organization, to visit a jobs page of the particular organization that lists job positions available at the particular organization, or to speak with a recruiter that is affiliated with the particular organization. Such an organization is referred to as the recruiting organization. A recruiting organization may initiate (e.g., create through an interface provided by content delivery exchange 120) multiple recruiting campaigns, one for each different type of job position for which there is an opening.

Like a content delivery campaign, a recruiting campaign may have a budget, may be associated with a bid price, and have a set of targeting criteria that is used to identify users that will be presented with one or more content items associated with the recruiting campaign.

Content items of a recruiting campaign may be limited to being presented on certain types of web pages within a website. For example, content items of a recruiting campaign (or all recruiting campaigns) are only allowed to be presented in a news feed on a user's (or member's) home page and/or on a search results page that lists one or more organizations (e.g., companies) that satisfy search criteria that a user entered in a text search field. Other example types of pages include other users' home pages, a jobs listing page that lists jobs in which a viewing user may be interested, a messaging page that provides an interface to conduct conversations with other users, and a notifications page that presents, to the viewing user, notifications that pertain to that user. Restrictions on where content item(s) of a recruiting campaign may be presented may be default restrictions, manually-specified restrictions (e.g., by the recruiting organization (or content provider) that initiated the recruiting campaign), or a combination of both.

Similarly, content items of a recruiting campaign may be limited to being presented on websites of certain third party publishers. Thus, content delivery exchange 120 may act as a content provider to a different exchange and select a content item of a particular recruiting campaign Entry Point Campaign In an embodiment, an "entry point" campaign is explicitly created for a recruiting organization and is a special type of recruiting campaign. A "normal" recruiting campaign (or "normal campaign" for short) is considered along with other recruiting campaigns of other recruiting organizations during a content item selection event. However, an entry point campaign is not part of a content item selection event where multiple content delivery campaigns from different content providers are considered. Only entry point campaigns from the same recruiting organization are considered.

An entry point campaign is one that is not associated with a bid price or, optionally, a budget. The entry point campaign may include the same (or at least a subset) of the targeting criteria of the normal campaign.

A normal campaign and a corresponding entry point campaign may be active concurrently. The entry point campaign may be represented in a database with a unique campaign identifier, similar to a normal campaign. The entry point campaign is used for situations where users request content related to the recruiting organization, such as a company page that describes the recruiting organization, a jobs page that lists job openings or opportunities provided by the recruiting organization, or a member's page where the member is an employee of the recruiting organization. Such pages are referred to herein as "entry point pages."

In an embodiment, an entry point page is restricted from including any advertisements, at least advertisements related to entities that are different than the recruiting organization.

In an embodiment, a recruiting organization specifies which type of entry point page is allowed to be modified to include content from an entry point campaign. For example, a particular recruiting organization may specify that content of a first entry point campaign may be presented only on a company page, while content of a second entry point campaign may be presented on all types of entry point pages.

An entry point campaign may have the same or similar starting criteria and/or the same or similar ending criteria as the corresponding normal campaign. Alternatively, the entry point campaign does not have the same or similar ending criteria as the corresponding normal campaign. For example, a normal campaign may end or become inactive if the budget of the normal campaign runs out, while the corresponding entry point campaign continues indefinitely. A recruiting organization may be allowed to specify (e.g., through a user interface during a campaign creation process) ending criteria for a normal campaign that is different than ending criteria for the corresponding entry point campaign. Such a user interface may be displayed after a representative of the recruiting organization opts in to employing an entry point campaign.

In an embodiment, if a recruiting organization provides explicit input (or certain types of input) to end or pause a normal campaign, then the corresponding entry point campaign is automatically ended. For example, a representative of a recruiting organization logs into a website, is presented with a list of campaigns that includes a normal campaign, selects the normal campaign, and selects an option to terminate the normal campaign. In response, the system terminates an entry point campaign that corresponds to the normal campaign. However, if the representative selects an option to pause the normal campaign, then than the corresponding entry point campaign may continue without pausing.

In a related embodiment, when ending, deactivating, deleting, or pausing a normal campaign, the corresponding recruiting organization is allowed (e.g., through a user interface) to indicate (whether explicitly or by default) to keep the corresponding entry point campaign active. For example, if a normal campaign is associated with an entry point campaign, then a user interface (that is presented to a representative of the corresponding recruiting organization) may concurrently present options for both the normal campaign and the entry point campaign. If the representative selects an option that modifies the status (e.g., active v. inactive) of the normal campaign or the ending criteria of the normal campaign, then the user interface is modified to present data that invites the representative to modify the status or ending criteria of the corresponding entry point campaign.

In an embodiment, an entry point campaign is implied. That is, a normal campaign includes a variable, flag, or other metadata that indicates that the normal campaign is to be considered when modifying a presentation of an entry point page. Thus, for example, a separate data entry (e.g., a record or row in a table of content delivery campaigns or a separate object in an object database) is not required for entry point campaigns.

In an embodiment, in order for a recruiting organization to target users exclusively who request an entry point page, the recruiting organization is required to opt in. "Opting in" involves providing, to content delivery exchange 120, input that explicitly indicates the willingness of the recruiting organization to have the entry point page appear differently to different users. Such input may be a radio button that a representative of the recruiting organization selects when creating a recruiting campaign.

Figure 2:
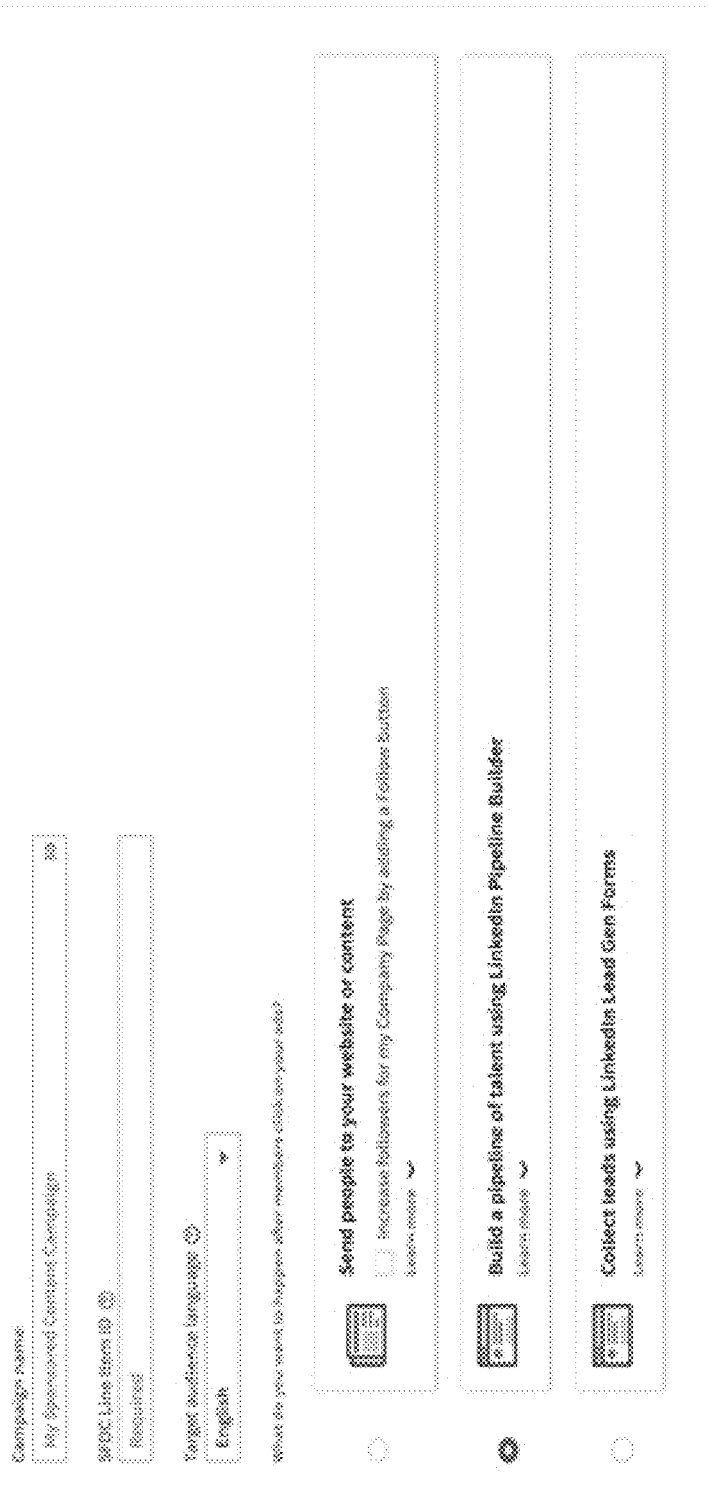
FIG. 2 is a screenshot of an example user interface that allows a representative of a recruiting organization to opt in to using an entry point campaign, in an embodiment.

FIG. 2 is a screenshot of an example user interface 200 that allows a representative of a recruiting organization to opt in to using an entry point campaign, in an embodiment. Opting in allows publisher 130 to customize (on the recruiting organization's behalf), using the entry point campaign, one or more entry point pages for viewers of the entry point page(s). In this example, user interface 200 allows a user to specify a name for a recruiting campaign, select a target audience language, and select one of three options regarding what the recruiting organization would like to happen if a user member selects a content item of the recruiting campaign. In this example, the user selects the second option, i.e., to build a virtual pipeline of talent. This option results in an entry point campaign being created and used to determine whether to customize an entry point page of the recruiting organization.

Alternatively, no opt in is required. Thus, it is presumed that recruiting organizations would like to exclusively target users who request an entry point page by being willing to have the recruiting organization's content change depending on who is requesting the content. Instead, an "opt out" may be required.

Targeting Criteria Changed

In an embodiment, a recruiting organization is allowed to modify targeting criteria of a normal campaign that is already active and that is associated with an entry point campaign. For example, a representative of a recruiting organization may add a particular job title (e.g., "Software Engineer"), update a particular job title (e.g., "Programmer" to "Senior Programmer"), delete a particular geographic location (e.g., Europe or English-speaking countries), or add an optional (or required) skill (e.g., "Machine learning"). A change to targeting criteria of a campaign (at least potentially) means that a different set of users will be targeted as a result of the change. Thus, a first set of users that are targeted by a first version of targeting criteria may be different than a second set of users that are targeted by a second version of the targeting criteria. The second set of users may be a strict subset of the first set of users or vice versa, may be overlapping, or may not overlap at all.

In an embodiment, a change to targeting criteria of a normal campaign is automatically propagated to targeting criteria of a corresponding entry point campaign. If metadata of the normal campaign indicates that the normal campaign is associated with an entry point campaign and there is no separate data entry (e.g., row or record in a database) that represents the entry point campaign, then no propagation is necessary because the entry point campaign essentially "shares" the targeting criteria of the normal campaign. However, if a separate data entry exists for the entry point campaign, meaning that targeting criteria of the entry point campaign is separately specified from targeting criteria of the normal campaign, then any changes that are made to targeting criteria of the normal campaign are automatically applied to the targeting criteria of the entry point campaign.

Process Overview

Figure 3:
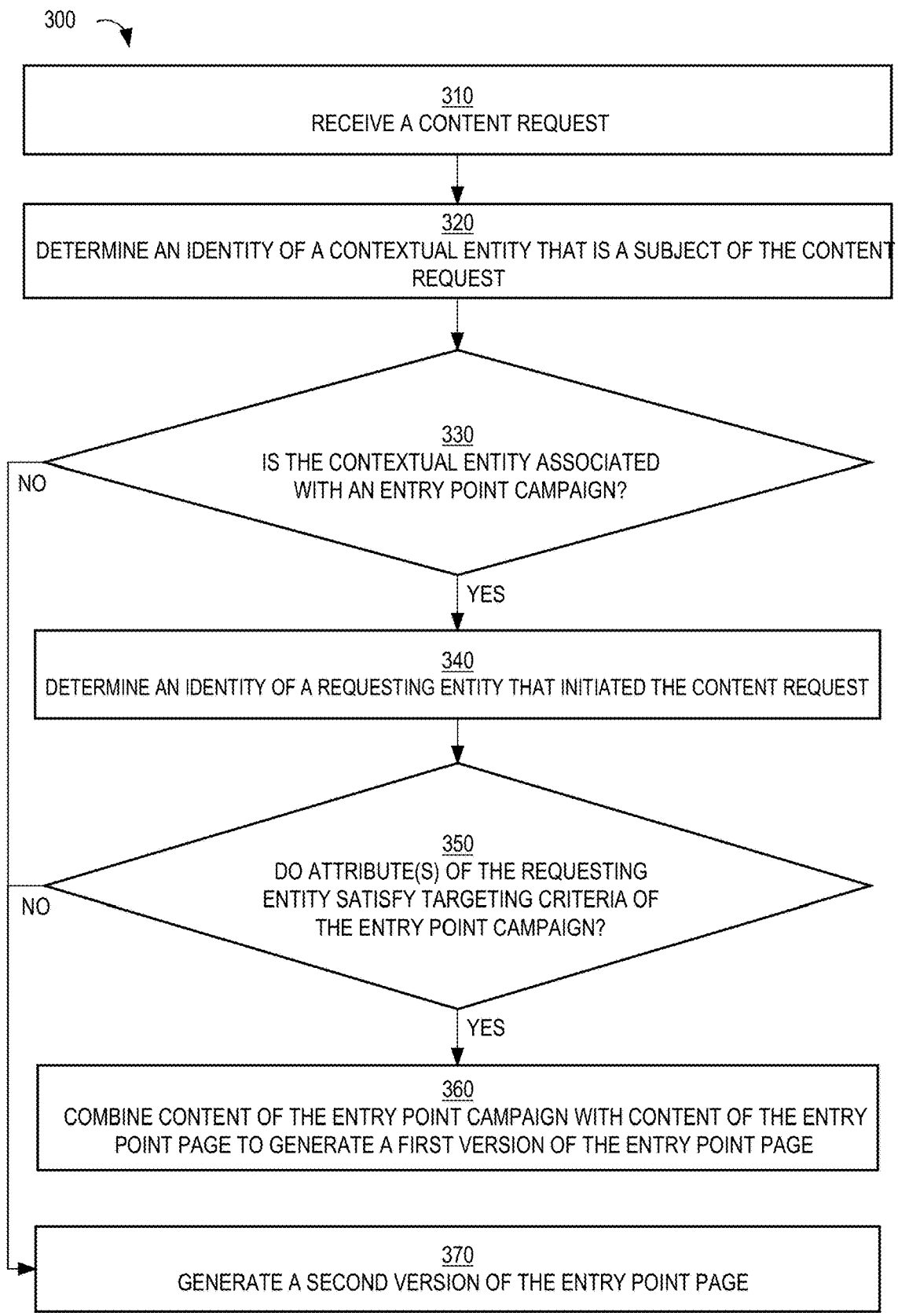
FIG. 3 is a flow diagram that depicts a process for determining which content to present to a user in response to a content request, in an embodiment.

FIG. 3 is a flow diagram that depicts a process 300 for determining which content to present to a user in response to a content request, in an embodiment. Process 300 may be performed by one or more components or elements of publisher system 130.

At block 310, a content request is received. The content request may comprise a portion of a URL, which identifies an endpoint that is associated with an application, such as a web application. The content request originates from a client device, such as client device 142, and traverses a computer network to arrive at publisher system 130. The content request is for an entry point page.

At block 320, an identity of a contextual entity that is a subject of the requested content is determined. The contextual entity may be identified in a URL (or a portion thereof) that is included in the content request. An example of a type of entry point page is a company home page that is hosted by publisher system 130 and that pertains to (or contains information about) the contextual entity. For example, the information may include an overview of the contextual entity, a size of the contextual entity, a location of the contextual entity, photos of the contextual entity, recent updates about the contextual entity, a stock price of the contextual entity, a number of employees at the contextual entity, and notable alumni of the contextual entity. The content of the company home page may be provided by the contextual entity, which is the recruiting organization that previously initiated a normal campaign and (whether explicitly or by default) initiated an entry point campaign that corresponds to the normal campaign.

At block 330, it is determined whether the contextual entity is associated with any entry point campaigns. If so, process 300 proceeds to block 340. Otherwise, process 300 proceeds to block 370.

Block 330 may be performed by identifying one or more campaigns (e.g., in a campaign database) associated with the contextual entity. Block 330 may be limited to searching only records of campaigns that were initiated by the contextual entity. If any campaigns are identified, then it is determined whether any of the identified campaigns is an entry point campaign or corresponds to an entry point campaign. If none of the identified campaigns is an entry point campaign or is associated with an entry point campaign, then process 300 proceeds to block 370.

At block 340, an identity of an entity associated with the content request is determined. The entity may be the client device or a user that operates the client device. The identity may be reflected in a cookie that the client device passes to publisher system 130, for example, as part of the content request.

At block 350, it is determined whether one or more attributes of the entity (identified in block 340) satisfy targeting criteria of the entry point campaign. If so, then process 300 proceeds to block 360. Otherwise, process 300 proceeds to block 370. The targeting criteria that is considered may be limited to criteria related to a user. Thus, the targeting criteria that is considered in block 350 may be a strict subset of the targeting criteria of the corresponding normal campaign. Example criteria include job title, job function, academic degree, academic institution attended, past employer(s), current employer, one or more geographic locations, one or more skills, etc.

Figure 4:
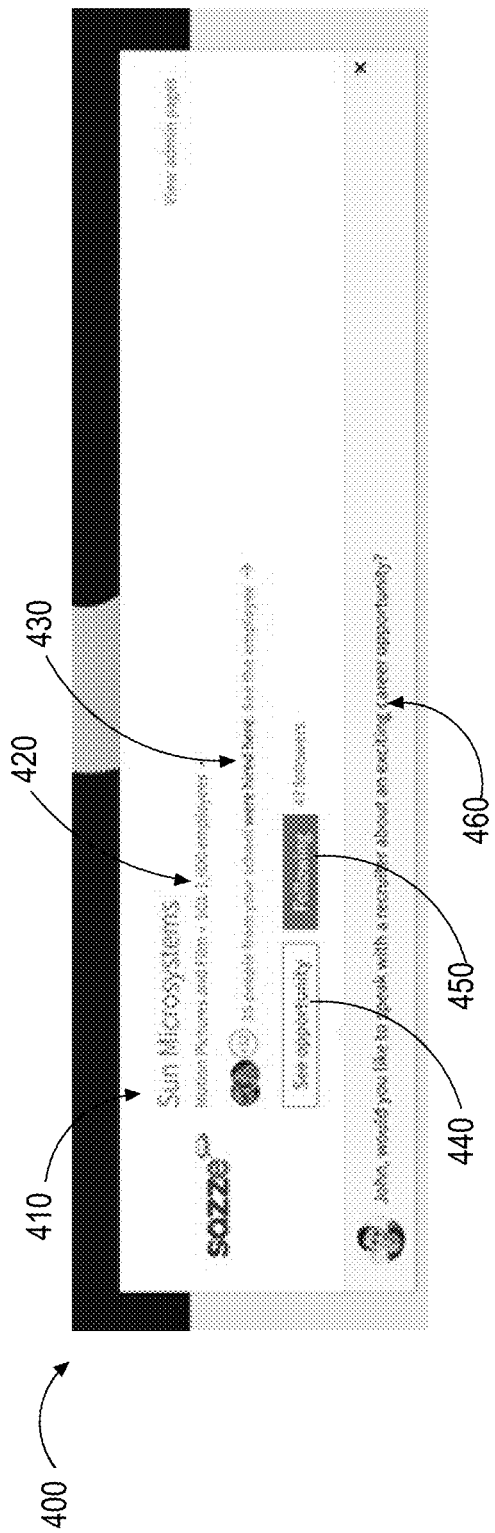
FIG. 4 is a screenshot that depicts first example entry point content of an entry point campaign, in an embodiment.

At block 360, content of the entry point campaign is combined with content of the entry point page to generate a first version of the entry point page. The content of the entry point campaign is based on an identity of the client device or user. For example, the content of the entry point campaign identifies the user and invites the user to view one or more specific job opportunities that are available at the contextual entity. FIG. 4 is a screenshot that depicts an example entry point content 400 of an entry point campaign, in an embodiment. In that example, the example entry point content 400:

- includes identification data 410 that identifies the contextual entity,
- includes metadata 420 about the contextual entity,
- includes school data 430 that indicates a number of people from the user's school that have been hired by the contextual entity,
- includes a "See opportunity" button 440 that, when selected, causes a landing page that lists one or more job positions that are suitable to the user to be displayed,
- includes a "Following" button 450 that, when selected, causes the user to subscribe to receiving future notifications regarding the contextual entity, and
- includes an invitation 460 that identifies the user and invites the user to speak with a recruiter about a career opportunity at the contextual entity.

Selection of the "See opportunity" button may also cause a record to be generated and added to a queue of candidates who have selected the same button or who have landed as the same landing page, regardless of how the user arrived there. The queue may be associated with a particular recruiter that is affiliated with the contextual entity. The queue allows the particular recruiter (or a representative of the contextual entity) to follow up with the user later, such as through a phone call, an email, or a push notification message to a software application (e.g., a "smartphone app") executing on the client device. Additionally or alternatively, the queue allows one or more messages to be automatically generated and sent to the client device through one or more channels, such as email, text, or software applications.

At block 370, a second version of the entry point page is generated. The second version does not include content of the entry point campaign that is included in the first version of the entry point page. In fact, the second version might not include any content from the entry point campaign. Further, the primary content of the second version might not be modified based on an identity of the client device or the user/viewer. Additionally, the second version may contain content that is not included in the first version, such as a generic invitation to view job opportunities. The second version may still contain data that indicates that a recruiter is interested in contacting the viewer about a job opportunity that may be relevant to the viewer.

Process 300 improves electronic content generation technology by taking into account recruiting campaigns when generating primary content in response to a content request so that the primary content is customized for each user that requests an entry point page.

While process 300 is described and depicted as occurring in a particular order and comprising a certain number of blocks, embodiments described herein are not so limited. For example, process 300 may include more or less blocks and/or blocks that occur in a particular order.

Tracking Previous Online Actions

In an embodiment, publisher system 130 keeps track of which users have already been presented with the first version of the entry point page that includes content of an entry point campaign. Publisher system 130 uses this information to determine whether to present the content of the entry point campaign. Publisher system 130 may compare a client device identifier or a user identifier reflected in the content request received in block 310 to one or more client device/user identifiers that have been previously associated with the contextual entity. If there is a match, then it is presumed that the corresponding user has already been presented with the content of the entry point campaign and, accordingly, process 300 proceeds to block 370 (instead of block 360). This check may be performed between block 340 and block 360.

In a related embodiment, publisher system 130 keeps track of which users have already visited a landing page to which content of a corresponding entry point campaign links or references. Publisher system 130 uses this information to determine whether to present content of the entry point campaign. If a particular user has already visited the landing page, then process 300 proceeds to block 370 (instead of block 360). In a related embodiment, process 300 proceeds to block 370 (instead of block 360) also if the user visited the landing page after being presented with the first version of the entry point page (i.e., that includes content of the entry point campaign). For example, a particular user may be presented with the first version of the entry point page if the particular user visited the landing page from an entry point that is different than one of the entry points described herein (such as a company home page or a jobs page). As another example, a particular user may be presented with the second version of the entry point page if the particular user previously selected the "See opportunity" button during a previous visit from one of the entry points to the landing page.

In a related example, a particular user is not presented with the first version of an entry point page if the particular user previously provided input during a previous session or visit, where the particular user was presented content of the entry point campaign and the input indicated that the particular user was not interested in the invitation or opportunity. For example, the input may be selection of a "No thanks" button that may be displayed adjacent to the "See opportunity" button. As another example, the input may be selection of the "x" button displayed at the bottom right of example entry point content 300.

Sub-Population Condition

In an embodiment, content of an entry point campaign is displayed only if the user visiting a corresponding entry point page satisfies not only the targeting criteria, but additional criteria that indicates how unique the user is relative to other users that are similarly situated. The additional criteria may be whether the user is one of a certain percentage of users that have a particular job title and live in a particular geographic area or location and that also satisfy the targeting criteria. The additional criteria (i.e., having a particular job title and being associated with a particular geographic area) is referred to herein as "sub-population criteria." To calculate the percentage, a denominator of the ratio may be defined as the number of users that satisfy the sub-population criteria. The numerator of the ratio may be defined as the number of users that satisfy the targeting criteria and the sub-population criteria.

In an embodiment, a recruiting organization specifies or selects one or more sub-population criteria for an entry point campaign. Such a selection may occur at the time the entry point campaign is created or after the entry point campaign has begun. Sub-population criteria may be a strict subset of the targeting criteria of the entry point campaign. For example, targeting criteria may include geo=SF Bay Area, job title=software engineer, and skill=machine learning, while sub-population criteria may be only geo=SF Bay Area and job title=software engineer. Alternatively, sub-population criteria may include one or more criteria that is not part of the targeting criteria of the entry point campaign. For example, targeting criteria may include geo=SF Bay Area, job title=software engineer, and skill=machine learning, while sub-population criteria may be only geo=SF Bay Area and industry=Tech. Another example sub-population criterion includes job function.

If a requesting user is one of a particular percentage of users that satisfy both the targeting criteria and sub-population criteria of the entry point campaign, then content of the entry point campaign is used to modify the entry point page. For example, if a user is one of only 15% or less of users with a particular job title, live in a certain geographic area, and satisfy the targeting criteria, then content of the entry point campaign is used to generate a version of the entry point page. Otherwise, another version of the entry point page is generated and presented to the user.

In an embodiment, a threshold ratio or percentage of an entry point campaign is a default value established by publisher system 130. Alternatively, the threshold ratio or percentage may be established (or modified) based on input from a representative of the corresponding recruiting organization responsible for the entry point campaign. Thus, different entry point campaigns established by different recruiting organizations may have different threshold percentages. Furthermore, different entry point campaigns established by the same recruiting organization may have different threshold percentages. For example, for a first entry point campaign, a threshold percentage is 15% and for a second entry point campaign, the threshold percentage is 24%.

Figure 5:
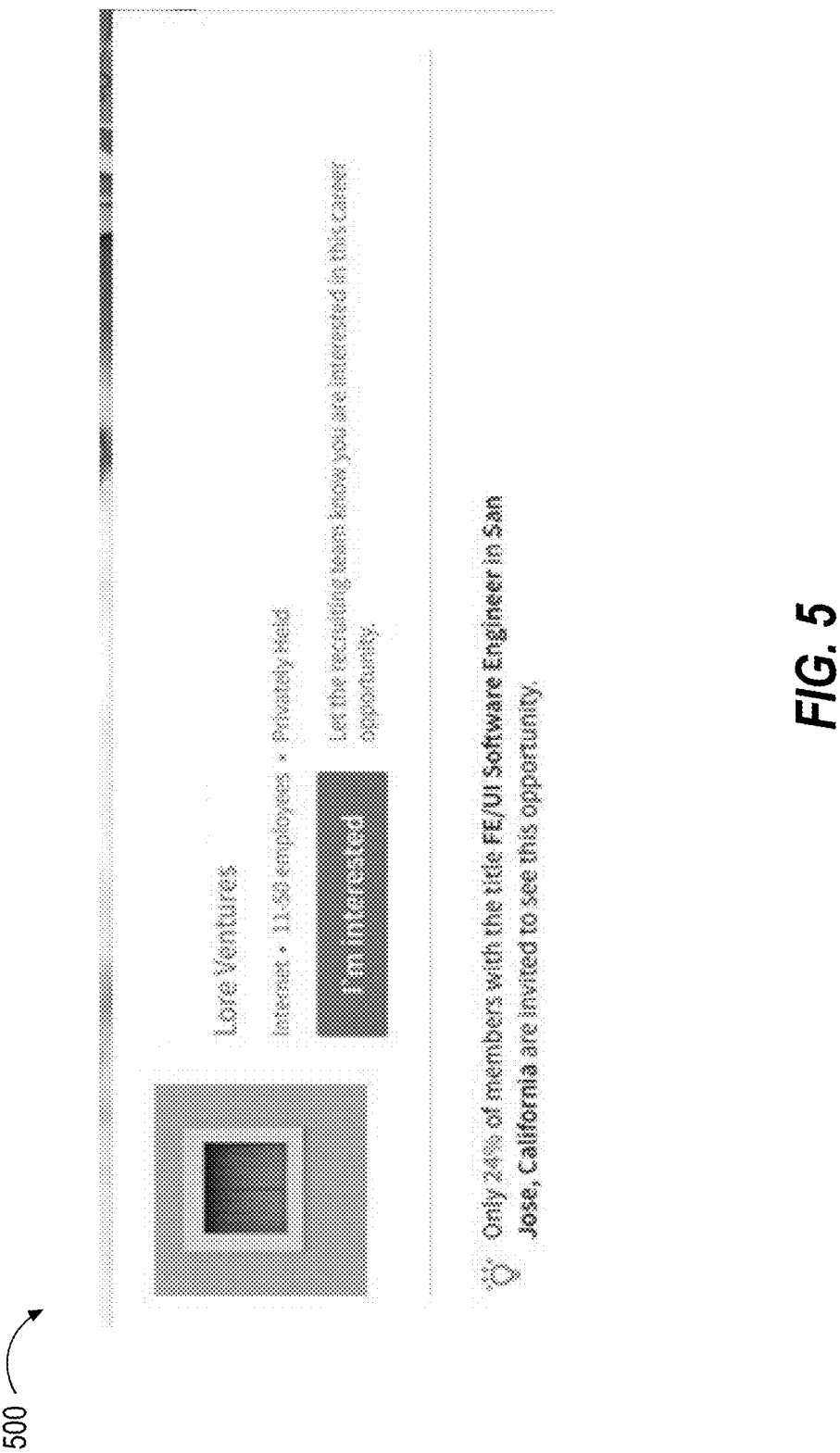
FIG. 5 is a screenshot that depicts second example entry point content of an entry point campaign, in an embodiment.

FIG. 5 is a screenshot that depicts example entry point content 500 of an entry point campaign, in an embodiment. Example entry point content 500 indicates that the user that requested an entry point page is one of 24% of members with the job title of "FE/UI Software Engineer" in San Jose, Calif. who are invited to see a certain job opportunity. If the user is interested, then the user selects the "I'm interested" button.

Multiple Checks

Figure 6:
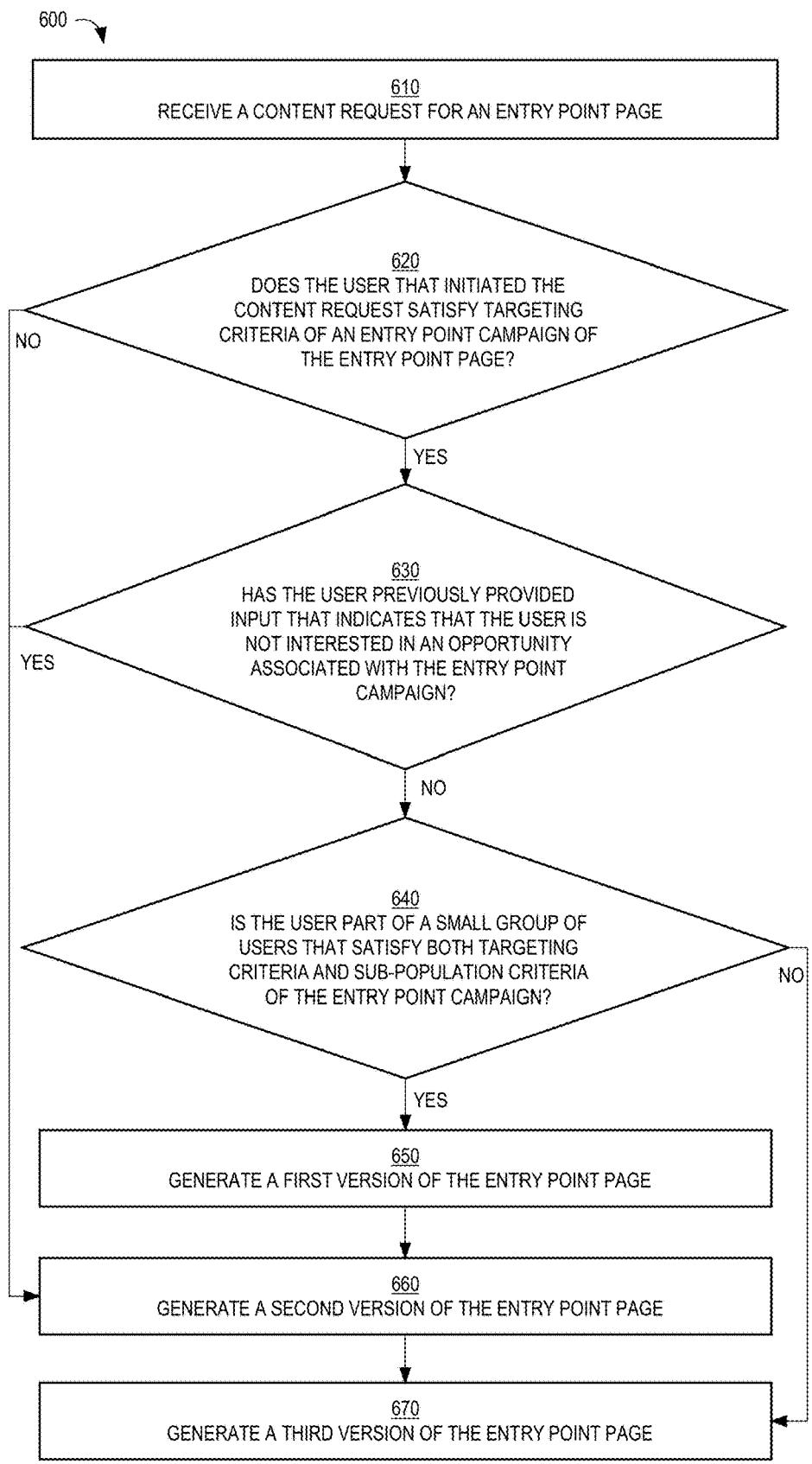
FIG. 6 is a flow diagram that depicts a process for determining which content to present to a user in response to a content request, in an embodiment.

FIG. 6 is a flow diagram that depicts a process 600 for determining which content to present to a user in response to a content request, in an embodiment. Process 600 may be implemented by components of publisher 130, content delivery exchange 120, or both.

At block 610, a content request for an entry point page of a particular recruiting organization is received.

At block 620, it is determined whether the user that initiated the content request satisfies targeting criteria of an entry point campaign associated with the entry point page. If so, process 600 proceeds to block 630. Else, process 600 proceeds to block 660.

At block 630, it is determined whether the user has previously provided input that indicates that the user is not interested in a job opportunity associated with the entry point campaign. If not, the process 600 proceeds to block 640; else, process 600 proceeds to block 660.

At block 640, it is determined whether the user is part of a relatively small percentage of users that satisfy both targeting criteria of the entry point campaign and sub-population criteria of the entry point campaign. If so, then process 600 proceeds to block 650; else, process 600 proceeds to block 670.

At block 650, a first version of the entry point page is generated and presented (or caused to be presented) to the user. The first version includes first content that is targeted specifically to the user, such as including a name of the user, including a statistic indicating that the user is part of a relatively small percentage or number of users, and/or inviting the user to perform a specific action, such as clicking on a graphical element or contacting a recruiter.

At block 660, a second version of the entry point page is presented to the user. The second version does not include customized content for the user. Instead the second version may be the same as is presented to users that request the entry point page but that do not satisfy targeting criteria of any entry point campaign associated with the entry point page.

At block 670, a third version of the entry point page is presented to the user. The third version may involve semi-targeted content that may refer to the user but not invite the user to perform a specific action, may not include a statistic regarding a sub-population, or may contain less specific content relative to the first version of the entry point page.

Selecting from Among Multiple Entry Point Campaigns of a Contextual Entity

When a user visits an entry point page of a particular contextual entity, the particular contextual entity may have multiple entry point campaigns that are currently active. The user or corresponding client device may satisfy (at least partially) the targeting criteria of multiple of those entry point campaigns. One or more selection criteria may be used to select an entry point campaign from among multiple entry point campaigns. Example selection criteria include:
the entry point campaign with the highest bid price
the entry point campaign with the highest budget
the oldest entry point campaign
the newest entry point campaign
the most recently activated (or reactivated) entry point campaign (or corresponding normal campaign) (where "activation" includes going from a paused state (based on first user input) to an active state based on second user input)
the entry point campaign that has been least frequently selected for the requesting user Thus, multiple entry point campaigns may be ranked according to one or more selection criteria and the highest ranked entry point campaign is selected to be used for a particular user that has requested (or is visiting) an entry point page.

Benefits

In addition to improvements to computer-related technology described herein, embodiments provide multiple benefits to end users and recruiting organizations. For example, a user's experience visiting certain web pages (or requesting certain content) is customized depending on whether the user satisfies certain criteria. Thus, users are presented with more relevant content. As another example, multiple signals (e.g., a current recruiting campaign, a viewer requests certain types of content related to the corresponding recruiting organization) are taken into account to infer the level of interest a recruiting organization has in a particular user and the degree in which to modify that particular user's experience when interacting with requested content of the recruiting organization.

Prior to embodiments described herein, a typical user who may be interested in changing jobs would do her own research, such as looking at a career page and visiting job posting websites. Only after engaging in multiple touch points, does such a typical user apply for a job or respond to an email from a recruiter. In contrast, embodiments allow acting immediately once a potential match between a particular user and a particular job opening is detected by communicating that match to the particular user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
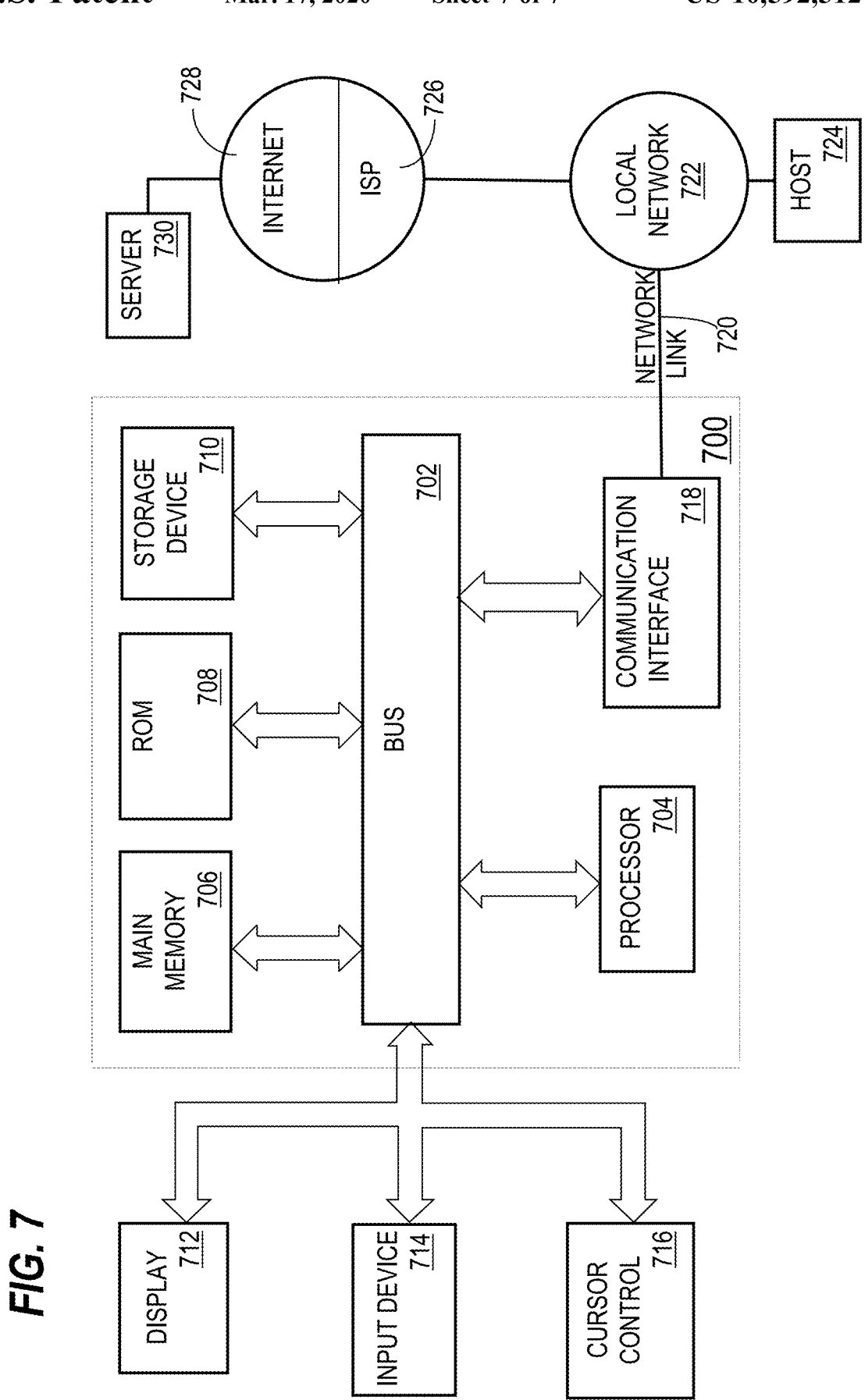
FIG. 7 is a block diagram that illustrates a computer system upon which an embodiment of the invention may be implemented

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, from a client device, a request for content about a first entity;
    in response to receiving the request:
        determining an identity of a second entity of the client device;
        identifying, based on the identity, a plurality of attributes of the second entity;
        determining whether the plurality of attributes satisfy targeting criteria of a content delivery campaign that was initiated by the first entity;
        in response to determining that the plurality of attributes of the second entity satisfy the targeting criteria:
            determining a first number of entities that (i) share one or more attributes in common with the second entity and (ii) satisfy the targeting criteria;

determining a second number of entities that share the one or more attributes in common with the second entity;

calculating a ratio based on the first number and the second number;

sending, to the client device of the second entity for display, first content that is based on the ratio;

wherein the method is performed by one or more computing devices.

2. The method of claim 1, wherein the one or more attributes include one or more of a particular job title, a particular job function, a particular industry, or a particular geographic location.

3. The method of claim 1, further comprising:

determining whether the ratio is below a particular threshold value;

wherein sending the first content is only performed if the ratio is below the particular threshold value.

4. The method of claim 1, wherein the content about the first entity is a company type of page that is hosted by a party that implements the method, wherein the content about the first entity includes multiple data items describing the first entity.

5. The method of claim 1, wherein the content about the first entity is a jobs type of page that is hosted by a party that implements the method, wherein the content about the first entity lists one or more job openings at the first entity.

6. The method of claim 1, further comprising, prior to receiving the request:

receiving input pertaining to the first entity, wherein the input specifies the targeting criteria;

based on the input, creating the content delivery campaign for the first entity.

7. The method of claim 6, wherein:

the input also includes opt-in data that indicates that the first entity opts in to allowing a party that implements the method to dynamically modify one or more pages pertaining to the first entity;

determining whether the plurality of attributes satisfy the targeting criteria is only performed if the opt-in data is received.

8. The method of claim 6, wherein the targeting criteria is first targeting criteria, further comprising, after sending the first content:

receiving, from the first entity, second input that indicates second targeting criteria that is different than the first targeting criteria;

after receiving the second input, receiving, from a second client device, a second request for content about the first entity;

in response to receiving the second request:

determining a particular identity of a third entity of the second client device;

identifying, based on the particular identity, a second plurality of attributes of the third entity;

determining whether the second plurality of attributes satisfy the second targeting criteria;

in response to determining that the second plurality of attributes satisfy the second targeting criteria:

determining a third number of entities that (i) share one or more second attributes in common with the third entity and (ii) satisfy the second targeting criteria;

determining a fourth number of entities that share the one or more attributes in common with the third entity;

calculating a second ratio based on the third number and the fourth number;

sending, to the second client device for display, second content that specifies the second ratio.

9. The method of claim 1, wherein the content delivery campaign is a first content delivery campaign, wherein the targeting criteria is first targeting criteria, further comprising, in response to receiving the request:

determining whether the plurality of attributes satisfy second targeting criteria of a second content delivery campaign that was initiated by the first entity and that is different than the first content delivery campaign, wherein the second targeting criteria is different than the first targeting criteria;

in response to determining that the plurality of attributes satisfy the first targeting criteria and the second targeting criteria, ranking the first content delivery campaign and the second delivery campaign according to one or more ranking criteria;

sending the first content only in response to determining that the first content delivery campaign is ranked higher than the second content delivery campaign.

10. The method of claim 1, further comprising:

after sending the first content, receiving, from the client device, feedback that indicates that the second entity is not interested in an opportunity specified in the first content;

receiving, from the client device, a second request for content about the first entity;

in response to receiving the second request:

determining the identity of the second entity of the client device;

determining whether the second entity provided the feedback;

in response to determining that the second entity provided the feedback, sending, to the client device for display, second content that does not include the first content.

11. The method of claim 1, further comprising:

receiving, from a second client device, a second request for content about the first entity;

in response to receiving the second request:

determining a particular identity of a third entity of the second client device;

identifying, based on the particular identity, a second plurality of attributes of the third entity;

determining whether the second plurality of attributes satisfy the targeting criteria of the content delivery campaign;

in response to determining that the second plurality of attributes do not satisfy the targeting criteria, sending, to the second client device for display, second content that does not include the first content.

12. A method comprising:

receiving, from a client device, a request for content about a first entity;

in response to receiving the request:

determining an identity of a second entity of the client device;

identifying, based on the identity, a plurality of attributes of the second entity;

determining whether the plurality of attributes satisfy recruiting criteria of only one or more recruiting campaigns that were initiated by the first entity;

when the plurality of attributes do not satisfy the recruiting criteria: then sending first content to the client device for display;

when the plurality of attributes satisfy the recruiting criteria, then determining whether one or more attributes of the second entity satisfy one or more sub-population criteria;

when the one or more attributes of the second entity do not satisfy the one or more sub-population criteria, then sending first job-related content to the client device for display;

when the one or more attributes of the second entity satisfy the one or more sub-population criteria, then sending, for display to the client device, second job-related content that is different than the first job-related content;

wherein the method is performed by one or more computing devices.

13. One or more non-transitory storage media, storing instructions which, when executed by one or more processors, cause:

receiving, from a client device, a request for content about a first entity;

in response to receiving the request:
  determining an identity of a second entity of the client device;
  identifying, based on the identity, a plurality of attributes of the second entity;
  determining whether the plurality of attributes satisfy targeting criteria of a content delivery campaign that was initiated by the first entity;
  in response to determining that the plurality of attributes of the second entity satisfy the targeting criteria:
    determining a first number of entities that (i) share one or more attributes in common with the second entity and (ii) satisfy the targeting criteria;
    determining a second number of entities that share the one or more attributes in common with the second entity;
    calculating a ratio based on the first number and the second number;
    sending, to the client device of the second entity for display, first content that that is based on the ratio.

14. The one or more non-transitory storage media of claim 13, wherein the one or more attributes include one or more of a particular job title, a particular job function, a particular industry, or a particular geographic location.

15. The one or more non-transitory storage media of claim 13, wherein the instructions, when executed by the one or more processors, further cause:
  determining whether the ratio is below a particular threshold value;
  wherein sending the first content is only performed if the ratio is below the particular threshold value.

16. The one or more non-transitory storage media of claim 13, wherein the content about the first entity is a company type of page that is hosted by a party that executes the instructions, wherein the content about the first entity includes multiple data items describing the first entity.

17. The one or more non-transitory storage media of claim 13, wherein the content about the first entity is a jobs type of page that is hosted by a party that executes the instructions, wherein the content about the first entity lists one or more job openings at the first entity.

18. The one or more non-transitory storage media of claim 13, wherein the instructions, when executed by the one or more processors, further cause, prior to receiving the request:

receiving input pertaining to the first entity, wherein the input specifies the targeting criteria;
based on the input, creating the content delivery campaign for the first entity;
wherein the targeting criteria is first targeting criteria;
after sending the first content:
  receiving, from the first entity, second input that indicates second targeting criteria that is different than the first targeting criteria;
  after receiving the second input, receiving, from a second client device, a second request for content about the first entity;
  in response to receiving the second request:
    determining a particular identity of a third entity of the second client device;
    identifying, based on the particular identity, a second plurality of attributes of the third entity;
    determining whether the second plurality of attributes satisfy the second targeting criteria;
    in response to determining that the second plurality of attributes satisfy the second targeting criteria:
      determining a third number of entities that (i) share one or more second attributes in common with the third entity and (ii) satisfy the second targeting criteria;
      determining a fourth number of entities that share the one or more second attributes in common with the third entity;
      calculating a second ratio based on the third number and the fourth number;
      sending, to the second client device for display, second content that specifies the second ratio.

19. The one or more non-transitory storage media of claim 13, wherein the content delivery campaign is a first content delivery campaign, wherein the targeting criteria is first targeting criteria, wherein the instructions, when executed by the one or more processors, further cause, in response to receiving the request:
  determining whether the plurality of attributes satisfy second targeting criteria of a second content delivery campaign that was initiated by the first entity and that is different than the first content delivery campaign, wherein the second targeting criteria is different than the first targeting criteria;
  in response to determining that the plurality of attributes satisfy the first targeting criteria and the second targeting criteria, ranking the first content delivery campaign and the second delivery campaign according to one or more ranking criteria;
  sending the first content only in response to determining that the first content delivery campaign is ranked higher than the second content delivery campaign.

20. The one or more non-transitory storage media of claim 13, wherein the instructions, when executed by the one or more processors, further cause:
  after sending the first content, receiving, from the client device, feedback that indicates that the second entity is not interested in an opportunity specified in the first content;
  receiving, from the client device, a second request for content about the first entity;
  in response to receiving the second request:
    determining the identity of the second entity of the client device;
    determining whether the second entity provided the feedback;

in response to determining that the second entity provided the feedback, sending, to the client device for display, second content that does not include the first content.

* * * * *